United States Patent [19]

Jones

[11] 4,215,551
[45] Aug. 5, 1980

[54] ENVIRONMENTALLY ASSISTED HEATING AND COOLING SYSTEM

[76] Inventor: John W. Jones, 2235 Titus Ave., Dayton, Ohio 45414

[21] Appl. No.: 950,796

[22] Filed: Oct. 12, 1978

Related U.S. Application Data

[62] Division of Ser. No. 807,987, Jun. 20, 1977, Pat. No. 4,158,291.

[51] Int. Cl.$^3$ .................... F03G 7/00; F01K 25/08
[52] U.S. Cl. .................................. 60/643; 60/648; 60/671; 60/641; 62/260; 165/45; 166/302
[58] Field of Search .................. 62/260; 166/302; 165/45; 60/641, 643, 645, 648, 670, 651, 671

[56] References Cited

U.S. PATENT DOCUMENTS

| | | | |
|---|---|---|---|
| 3,013,609 | 12/1961 | Brink | 166/302 X |
| 3,228,471 | 1/1966 | Shook | 166/302 X |
| 3,357,490 | 12/1967 | Holmes | 166/57 X |
| 3,815,674 | 6/1974 | Best et al. | 166/57 |
| 4,011,736 | 3/1977 | Harrison | 165/45 |
| 4,079,590 | 3/1978 | Sheinbaum | 165/45 X |

*Primary Examiner*—Allen M. Ostrager
*Attorney, Agent, or Firm*—Dybvig & Dybvig

[57] ABSTRACT

A heating and cooling system comprises a first reservoir containing liquid at an elevated temperature, solar collecting means exposed to solar radiation for collecting solar energy and means disposed in thermal exchange relationship with said first reservoir for transmitting heat energy from said solar collecting means to said first reservoir, a second reservoir containing a liquid disposed in thermal exchange relationship with a portion of the earth, means for blending liquids derived respectively from thermal exchange relationship with said first and second reservoirs, a heat engine having first and second refrigerant coils, one of said refrigerant coils disposed in thermal exchange relationship with an atmosphere to be heated or cooled, and valve means responsive to the refrigerant pressure in said other coil for delivering blended liquor from said blending valve to thermal exchange relationship with said other refrigerant coil, whereby heat energy to be extracted from or delivered to said other refrigerant coil is supplied by a blend of liquids, one of which derives its thermal energy from the sun and the other of which exchanges energy with the earth.

1 Claim, 5 Drawing Figures

FIG-1

ENVIRONMENTALLY ASSISTED HEATING AND COOLING SYSTEM

This is a division of application Ser. No. 807,987, filed June 20, 1977 for Environmentally Assisted Heating and Cooling System, now U.S. Pat. No. 4,158,291.

BACKGROUND OF THE INVENTION

1. Field of the Invention

The present invention relates to apparatus for conditioning air or another fluid medium and, more particularly, to such an apparatus employing a heat engine having first and second refrigerant coils, one disposed in thermal exchange relation with the medium to be heated or cooled and the other disposed in thermal exchange relation with a liquid.

U.S. Pat. No. 2,689,090 describes a heating system comprising a heat engine having a first refrigerant coil mounted for thermal exchange with an atmosphere to be heated and a second refrigerant coil mounted for thermal exchange with a liquid, the temperature of which is determined by an atmospheric heat absorber connected in series relationship with a liquid-carrying coil disposed within the soil of the earth.

SUMMARY OF THE INVENTION

A difficulty with prior art of the type described above is that inadequate provision has been made for the collection of solar energy which is available in vast amounts about the world; and, furthermore, inadequate provision is made for the storage of the solar energy which is readily collected. A still further disadvantage of the prior art is that, while attempts have been made to utilize the thermal energy available from the molten core of the earth, the prior art has failed to provide a system capable of blending energy in storage which has been derived from the sun with thermal energy available from the body of the earth.

The present invention overcomes the foregoing limitations by providing a first reservoir capable of storing large quantities of energy derived from solar radiation and a second reservoir supporting liquid in thermal exchange relationship with the earth and by providing means for blending the solar-heated liquid with the liquid having heat exchange relationship with the earth in such fashion as to satisfy the thermal requirements of a heat engine or heat pump operating as required in either a heating mode or a cooling mode. Described in the present application are a first embodiment utilizing well water and a second embodiment utilizing a different medium, not necessarily well water, disposed in thermal exchange relationship with the earth.

In still another embodiment, the present invention utilizes gravitationally separated oil and water in a reservoir or tank. Water from the reservoir is pumped from the reservoir through solar collectors to provide an efficient transfer of solar energy from the solar collectors to the reservoir. When the pump is not operating to heat the reservoir, the apparatus is so arranged that the oil migrates upwardly from the reservoir into the collectors, thereby avoiding problems such as freezing or boiling in the collectors.

An object of the present invention is to provide a heat engine having at least one refrigerant coil disposed in heat exchange relationship with a blend of liquids, one of which is influenced by solar energy and the other of which is influenced by heat energy available from the earth.

Another object of the present invention is to provide a heating and cooling system including a first reservoir for a solar-heated liquid adequate in size to supply system needs for solar energy during intervals when sunlight is unavailable and which includes an additional reservoir in thermal exchange relationship with the earth which can supplement system needs for heat energy.

Other objects and advantages will become apparent from the following description and the drawings.

DESCRIPTION OF THE PREFERRED EMBODIMENT

Figure 1:
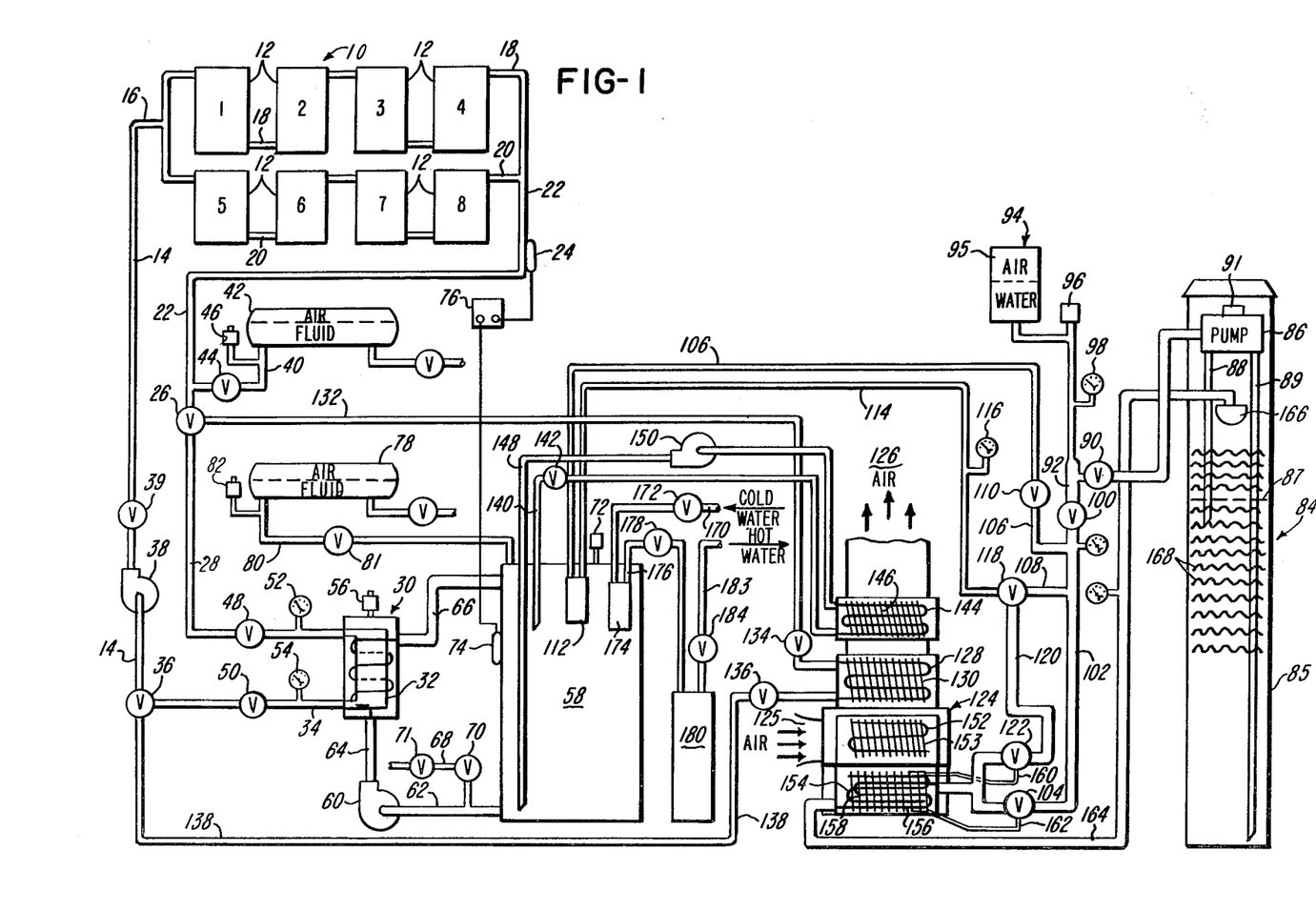
FIG. 1 is a diagrammatic illustration of a heating and cooling system in accordance with the present invention.

Referring to FIG. 1, solar energy is accumulated by means of a solar collector 10 comprising a pluarlity of panels 12. In general, the number of panels 12 will depend upon the size of the building or other structure in which the air is to be controlled and the geographic location of the building. The panels 12 are preferably mounted on an area of the roof of the building so as to be irradiated by sunlight during a preponderant portion of the daylight hours. Thus, in the northern hemisphere, the panels 12 would be preferably mounted on a portion of the roof which has a southern exposure. As will become apparent, however, it will not be important that the panels be so positioned that their absorbence of solar energy will be maximized during any particular season or during any particular day. Thus, no means to track the movement of the sun is required. Those skilled in the art will appreciate, however, that various economies, particularly in the sizing of components to be described and the number of solar panels required, can be effected by a judicious positioning of the panels.

The panels 12 are of the type in which solar energy absorbed by the irradiated surfaces of the panels is transferred to a fluid circulated so as to contact the panels behind the solar-heated surface of the panels. A number of types of panels suitable for use in the solar collector 10 are commercially available.

In the present invention, the liquid which receives the solar heat energy collected by the panels 12 may be a brine solution or a conventional antifreeze solution, such as a mixture of ethylene glycol and water. However, to minimize corrosion or other adverse chemical effects, it is preferred that the liquid medium which receives the solar energy is in the form of a light oil.

The solar fluid is delivered to the panels 12 through a conduit 14 connecting to a branching conduit 16 which divides the flow of solar fluid into two generally parallel branches. The upper branch brings the solar fluid into contact with collector panels numbered 1, 2, 3 and 4 engaged at opposite end portions of each panel by connecting conduits 18. The arrangement is such that the solar fluid flows downwardly aong the backside or nonirradiated surface of the panel 1, then across to the lower side of the panel 2 within a connecting conduit 18, then upwardly along the nonirradiated surface of the panel 2 and so on, the direction in which the solar fluid washes behind each of the panels in the upper branch reversing from panel to panel as the fluid progresses from left to right as the panels appear in FIG. 1 along the upper branch of panels.

The lower branch of panels comprises the panels labeled 5, 6, 7 and 8, and the solar fluid progressing through this branch also reverses in direction as it passes from one panel to the next adjacent panel.

The solar fluid exits the two branches of panels described through connecting conduits 18 and 20 to a collector conduit 22 which delivers the solar fluid alongside a temperature sensor 24 which is in thermally conductive contact with the collector conduit 22. Except on an exceptionally overcast day, whether it be winter or summer, the temperature sensed by the temperature sensor 24 can be well in excess of 100° F. (37.78° C.).

The conduit 22 delivers the solar fluid to a three-way valve 26. As will be later described, this three-way valve responds to the thermal requirements of the building being conditioned to stop the flow of solar fluid, or to deliver the solar fluid onwardly to a conduit 28 or, alternatively, to divert the solar fluid to a conduit 132, which remains to be described. For present purposes, it can be assumed that the three-way valve is positioned by reason of thermostatic controls to deliver the solar fluid onwardly to the conduit 28.

The pressure of the fluid passing through the conduit 22 is stabilized by means of a stabilizer 42 connected by a conduit 40 to the conduit 22, the passage of fluid through the conduit 40 being regulated by means of a service valve 44. A vent 46 connects air residing above the fluid within the stabilizer with the ambient atmosphere.

The solar fluid, which is now hot, as evidenced by a temperature gauge 52, progresses through the conduit 28 and through a normally open service valve 48 to a liquid heat transfer unit 30. The transfer unit 30, which is vented to the ambient atmosphere by a vent 56, houses a pair of convention intertwined coils designated collectively by the reference number 32. The intertwined coils are not shown in detail because conventional. One of the intertwined coils conducts the solar fluid tortuously from the conduit 28 to a return conduit 34 which returns the solar fluid past a temperature gauge 54 and a service valve 50 to a three-way valve 36, which is now positioned by suitable thermostatic controls, to be described, to return the solar fluid to the conduit 14 where the solar fluid is advanced by a pump 38 and through a service valve 39 for return to the solar collector 10.

Within the heat transfer unit 30 the coil which has conducted the solar fluid from the conduit 28 to the return conduit 34 has been in thermally conductive contact with a second coil (not detailed) which receives water from a holding tank 58. The water is advanced from the lower portion of the holding tank through a conduit 62 by means of a pump 60 which advances the water through a conduit 64 for passage through the heat transfer coil (not detailed) which is in thermal contact with the heat transfer coil for the solar fluid. The water thus advanced by the pump 60 is permitted to absorb heat from the solar fluid passing through the heat transfer unit 30, and the resultant relatively hot water is passed through a conduit 66 to an upper portion of the holding tank 58.

As those skilled in the art will appreciate, the heat transfer unit 30 can transfer heat only from a hotter liquid to a cooler liquid. Thus, if the solar fluid is cooler than the water residing in the holding tank 58, heat would be extracted from the holding tank for transfer to the solar collecting panels. The desired operation is the reverse, and accordingly a temperature sensor 74 is contacted with the wall of the holding tank at an intermediate elevational level. The temperature sensor 74 associated with the holding tank and the aforementioned temperature sensor 24 associated with the solar fluid are compared by means of a differential thermostat 76. By means of conventional electric circuitry (not detailed), the differential thermostat 76 activates the three-way valve 26 to its off position whenever the temperature of the holding tank exceeds the temperature of the solar fluid.

The pressure within the holding tank 58 is regulated in reference to that of the ambient atmosphere by means of a stabilizer tank 78 with which the air residing within the holding tank is placed in communication by means of a conduit 80 regulated by a service valve 81. A vent 82 communicating with the conduit 80 vents excessive pressures to the ambient atmosphere.

Assuming the building whose inside temperature is to be conditioned with aid of the present invention to be a 1500 square foot (139.5 square meter) home, the holding tank 58 may be sized to hold 1000 gallons (3785 liters) of water. In order to simplify the drawings and better reveal certain details of the present invention, a layer of insulation that will be preferably associated with the holding tank has been omitted. In particular, the holding tank is preferably encapsulated with at least a few inches thick of a good thermal insulating material. Such insulating material will preferably cover not only the side walls but also the top and bottom portions of the holding tank. The temperature sensor 74 is preferably in direct contact with the wall of the holding tank, which may be of metal, and thus will ordinarily be encapsulated within the surrounding insulation, which is not illustrated.

As will be further described, the holding tank is part of an ordinarily closed water system. There is ordinarily no requirement for the addition of water to or the withdrawal of water from such closed system. For the purpose of initially filling the holding tank and adding makeup water as may from time to time be required, the holding tank has communication to a water supply (not shown), which may be a municipal water supply. The water from the water supply is passed through a conduit 68 monitored by a pressure-reducing valve 70 and normally closed by a service valve 71. Water passing through the conduit 68 subject to the control of the service valve 71 may be permitted from time to time to enter the conduit 62, which delivers water from a lower portion of the holding tank to the heat transfer unit 30 with aid of the pump 60. As previously indicated, water will ordinarily be added to the holding tank through the conduit 68 only when initially filling the holding tank and otherwise only in exceptional cases when makeup water is required. Thus, the service valve 71 is ordinarily closed and the pump 60 is ordinarily used only to cycle water from the holding tank through the heat transfer unit. Such cycling in employed not only to extract heat from the solar fluid heated by means of the solar collector 10 but also to reduce any tendency of the water residing in the holding tank 58 to stratify and thereby develop separated zones of relatively hot and relatively cool water.

As appears in the drawings, a limit switch 72 is employed in conjunction with the aforementioned service valve 71 to prevent an overfilling or unwarranted pressurizing of the holding tank. The temperature sensor 74, while used in cooperation with the solar temperature sensor 24 to minimize an undesirable extraction of heat from the holding tank when the solar fluid is not adequately warm, is used additionally to actuate the three-way valves 26 and 36 to their respective closed positions when the temperature in the holding tank 58 has reached a predetermined upper limit. To minimize corrosion of metallic elements contacted by the water in the described closed water system and nevertheless provide adequate heat for the purposes to be described, the temperature sensor 74 is normally set to limit the holding tank temperature to approximately 140° F. (60° C.). Higher temperatures, such as 180° F. (88.22° C.), for example, are possible. However, the corrosive effects of the water being held typically outweight any advantages to be derived from such higher temperatures.

Experience with a 1000 gallon (3785 liter) holding tank as described associated with a well-insulated but otherwise conventionally constructed home having 1500 square feet (139.5 square meters) of living area and located near Dayton, Ohio, revealed during the winter months bridging 1976 and 1977 that supplemental heat such as will be described was necessary only infrequently, even though the atmospheric temperature outside the house ranged as low as −24° F. (−31.11° C.) and averaged throughout the winter months to a record low for that area. The solar panels employed during this test period measured three feet by six feet (91.44 cm. by 182.88 cm.) in area, totaled seven in number and were roof-mounted with a southerly exposure.

For purposes of supplying the supplemental heat which has been indicated to be only infrequently needed, a source of geothermal heat is employed. The geothermal heat here referred to is that heat diffusing outwardly from the core of the earth, which is alleged to be molten. The transition between the molten core and the nonmolten outer portions or crust of the earth is thought to occur at a depth of approximately 1800 miles (2896.2 kilometers) below the surface of the earth. As is well known, caves in the temperate zones of the earth and generally elsewhere have an inside atmospheric temperature in the vicinity of 55° F. (12.78° C.), provided the cave is sufficiently deep and isolated that the atmosphere of the cave is not readily exchanged with the atmosphere at the surface of the earth. The cave located in Kentucky and known as Mammoth Cave is an example of such a cave, and the temperature of this and similar caves is taken, for purposes of describing this invention, as representing the temperature of a relatively closed volume of air which is in thermal equilibrium with the heat energy diffusing outwardly from the center of the earth.

Accordingly, when reference is made to geothermal heat in the present application, reference is being made to that thermal energy which is present just below the frost line, i.e., the energy residing in underground portions of the crust of the earth which are well insulated from the atmosphere of the earth.

In the embodiment of the present invention which is schematically illustrated in FIG. 1, the source of geothermal energy is a well 84 having a casing 85 extending sufficiently deep into the earth that thermal exchange can occur between water or a nonfreezing liquid such as a light oil and the ground water. Alternately, the casing may contain suitably located perforations (not shown) for the entry of ground water. It should be appreciated that the physical features of the well are unimportant beyond the fact that ground water is permitted to seep into the well or otherwise effect a thermal transfer with a liquid residing in the casing. FIG. 1 illustrates a water level 87, which is the level to which liquid normally resides in the well 84. The liquid residing in the well can be assumed to be water for purposes of the following discussion, except as otherwise stated.

The water accumulated in the well is raised out of the well by means of a conventional pump 86. The pump 86 is associated with two draft tubes 88 and 89, the tube 88 drawing shallow water and thus relatively warm water upwardly and the tube 89 drawing deep water and thus relatively cool water upwardly. The selection of the draft tube that will be used during any given pumping operation is controlled by a solenoid device 91 regulated by a household thermostat (not shown). As will become later apparent, the shallow draft tube 88 is employed during the cold months and the deep draft tube 89 is employed during the warm months.

The water delivered by the pump 86 may be regulated by a service valve 90. The water from the pump 86 enters a receiving tube 92 which has communication with the lower portion of a pressure control housing 94, the water forced into the housing 94 by operation of the pump 86 pressurizing a volume of air 95 residing above the water. A well pressure control 96 having communication with the receiving tube 92 disables the pump 86 when the pressure of the air in the housing 94 is adequate to supply immediate needs during the interval required to reenergize the pump 86. A thermometer 98 provides a visual inspection of the temperature of the water being sustained in the receiving tube 92.

The water contained in the receiving tube 92 is directed through a pressure-reducing valve 100 to three possible outlet passages. The first passage comprises a conduit 102 terminating with a pressure control valve 104. For present purposes, the valve 104 can be considered to be a normally closed valve. An important function of this valve will be later described, however.

A second passage available to the water contained in the receiving tube 92 is through a conduit 106 past a service valve 110 to a heat exchanger 112 immersed in the water contained in the holding tank 58. The water passed through the heat exchanger 112 exits the heat exchanger through a conduit 114 and past a thermometer device 116 to a blending valve 118.

The blending valve 118, which will be later described in greater detail, blends hot water received from the holding tank by reason of the heat exchanger 112 with geothermal well water received from the receiving tube 92 through the pressure-reducing valve 100, the geothermal water entering the blending valve through a conduit 108. As already explained, the holding tank is preferably maintained to an approximate 140° F. (60° C.) temperature, and the geothermal or well water brought to the blending valve 118 is typically in the vicinity of 55° F. (12.78° C.). The blending valve 118 is preferably set to provide a blend of approximately 65° F. (18.33° C.). Since there will be variations in the thermal temperature available from the heat exchanger 112 due to varying extractions of heat from the holding tank and there may also be minor changes in the well water temperature due to changing water table conditions and the return of water being used in the practice of the present invention to the well, as will be explained, the blending valve 118 includes a temperature-compensating mechanism to be described which automatically adjusts the blend of hot water with well water so as to maintain the desired approximate 65° F. (18.33° C.) blend delivered to a conduit 120 so long as possible. The conduit 120 terminates with a pressure control valve 122, which may be regarded initially as a normally closed valve.

The aforementioned valves 104 and 122 are provided to serve the needs of a heat pump or heat engine 124. The heat engine 124 is of a commercially available type operating basically on a Carnot cycle and equipped with a conventional means (not shown) for reversing the flow of a refrigerant such as Freon through the heat engine. As well known to those skilled in the art, the heat engine will comprise at least two coils serving as evaporator and condensor coils and reversing their respective functions when the direction of refrigerant flow through the heat engine is reversed.

Operating in conjunction with the aforesaid coils is a conventional compressor (not shown) and a conventional throttle valve or the equivalent (not shown).

The heat engine 124 is shown as having an upper coil 152 which may serve either as evaporator or condenser, depending upon the direction of refrigerant flow, and a lower coil 154 which will also serve as evaporator or condenser, depending upon the direction of refrigerant flow.

The coil 152 has an associated fin 153. The fin 153 is adapted for thermal transfer with air cycled through the heat engine 124 by a suitable propeller means (not shown), the air progressing from a household or building region 125 to a household or building region 126. The regions 125 and 126 may be different areas of a single room or may be interconnected for the distribution of air throughout a household or building by any suitable means, such as ducts or the like.

As is conventional, the heat engine will be energized from any suitable source of power (not shown), either to heat or cool the region 126, an appropriate thermostatic switch (not shown) being actuated to selectively initiate heating or cooling. The aforementioned solenoid device 91 is interconnected with the thermostatic switch so that when the thermostatic switch energizes the heat engine to cause condensation in the coil 152 and thus heating of the region 126, the solenoid device 91 will operate to cause the pump 86 to draw relatively warm, shallow water from the well 84. Conversely, when the heat engine is energized to cool the region 126, the solenoid device 91 is energized to cause the pump 86 to draw relatively cool water from the deep portion of the well 84, thus facilitating operation of the coil 154 as a condensing coil and the coil 152 as an evaporating coil.

The lower coil 154 of the heat engine is entwined in thermal contact with a water coil 156, the entwined coils being in conductive thermal contact with suitable thermal transfer fins 158. Depending upon the operating mode required, the pressure valve 104 will be open to admit geothermal water from the well 84 to the water coil 156. This operating mode will occur when the refrigerant coil 154 is serving as a condensing coil and well water drawn through the tube 89 is admitted by the pressure valve 104 to extract heat from the condensing coil 154. This extracted heat is returned to the well through a return conduit 164, which leads the return water to the well through an aerator 166.

This aerated water is sprayed by the aerator onto fins 168 which are encircled by and exchange heat with the well casing 85. The aeration functions predominantly to slow the downward flow of the returned water over the fins 168, thus helping the returned water to remain at an upper level in the well.

When the heat engine 124 is operating in a mode which causes its lower coil 154 to function as an evaporator, the solenoid device 91 is so operated that the relatively warm water residing near the top of the well 84 will be drawn upwardly through the tube 88. This reduces the chances that evaporation occurring in the coil 154 will induce the freezing of water passing through the water coil 156. To further minimize the possibility of freezing, the pressure valve 122 is opened, as will be described, so that blended water from the blending valve 118 flows through the water coil 156. Thus, the refrigerant coil 154 will be in contact with the water coil 156 and an adequate supply of heat for extraction is assured by blending the warmest water available in the well 84 with relatively hot water extracted from the holding tank 58 by the heat exchanger 112.

Those skilled in the refrigeration art will appreciate that when the lower coil 154 of the heat engine 124 is operating in the condensing mode, this is because the compressor included in the heat engine, taken in conjunction with the direction of refrigerant flow, is causing the refrigerant to condense in the refrigerant coil 154. Thus, the coil 154 will then be receiving the refrigerant under a high pressure. Conversely, when the operating mode of the heat engine 124 causes the coil 154 to serve as an evaporator coil, the direction of refrigerant flow will have been reversed so that the condensation of refrigerant is occurring in the upper coil 152 and the lower coil 154 is receiving evaporating refrigerant at a comparatively low pressure. There are thus two basic operating conditions experienced by the lower refrigerant coil 154, either a condition of relatively high pressure condensation or a condition of relatively low pressure evaporation.

The pressure valves 104 and 122 are a type commercially available from Penn Controls, Incorporated of Goshen, Indiana, valve 122 being a reverse acting valve, Model Number V46NC-2, and valve 104 being a direct acting valve, Model Number V46AC-1. The valve 122 is connected to the refrigerant coil 154 through a connecting and sensing tube 160. Likewise, the pressure valve 104 is connected to the refrigerant coil 154 by means of a connecting and sensing tube 162.

The pressure valve 122 is adjusted by means not illustrated, on installation to open only when exposed to the refrigerant pressures occurring during refrigerant evaporation in the coil 154. Conversely, the pressure valve 104 is set to open only when exposed to refrigerant pressures occurring during refrigerant condensation in the coil 154. In both cases, the pressure valves open against a spring load.

Accordingly, when the coil 154 is serving as an evaporator coil, the refrigerant pressure in the coil 154 drives the pressure valve 104 to a closed position and drives the pressure valve 122 to an open position, the degree of opening being in proportion to the refrigerant pressure. Conversely, when the coil 154 is in the condensation mode, the valve 122 is driven to a closed position and the valve 104 is drawn by the reduced pressure during evaporation to open the valve 104, the degree of opening being in proportion to the reduction of pressure occurring in the coil 154. for the coil 154, the pressure of the refrigerant residing in the coil 154 indicates the amount of heat that is to be extracted from that coil. Thus, the greater amount of heat to be extracted, the higher the refrigerant pressure and the further the valve 104 is driven open. In consequence, the greater the refrigerant pressure, the through the water coil 156 for purposes of heat extraction. Conversely, the lower the refrigerant pressure during evaporation, the greater is the amount of blended water from the blending valve 118, which is permitted to enter the water coil 156 so as to deliver heat to the refrigerant. The valves 104 and 122 thus respond to the requirements of With the foregoing discussion concerning the operation of the heat engine, it is now possible to consider the broad range of operating modes rendered available by the present invention. For the purposes of this discussion, one can consider a home as descried earlier having 1500 square feet (139.5 square meters) of living area and located in the temperature climate of either the northern or southern hemispheres. Assuming summertime in the northern hemisphere, for example, the solar heat collected by the solar panels 12 will be more than adequate throughout the summer months to maintain the preferred 140° F. (60° C.) temperature in the solar holding tank. A heat exchanger 174 immersed in the water of the holding tank may receive household water such as available from a municipal supply through a conduit 170 subject to regulation of a service valve 172. Such household water is heated by way of the heat exchanger 174 immersed in the holding tank and forwarded through a conduit 176 subject to regulation of a service valve 178 to a standby water heater 180. The water passed through the water heater 180 exits through a conduit 183 subject to regulation of a service valve 184 for delivery to whatever kitchen, bathroom and like facilities the household possesses. The water heater 180 may be a conventional gas-fired household hot water heater. However, fuel consumption is ordinarily not required in the standby unit since the heat available for extraction from the holding tank will ordinarily be sufficient for household hot water needs.

Since household heat is rarely required in the summer months in the temperate climates, the pumps 38 and 60 will be operated only periodically at such intervals as required to maintain the 140° C. (60° C.) temperature in the holding tank and to satisfy the houshold bath and kitchen requirements for hot water. Accordingly, a suitable electrical connection responsive to the temperature sensor 74 disables one or both of the pumps 38 and 60 when the temperature of the water in the holding tank reaches or exceeds 140° F. (60° C.).

The present invention contemplates maintenance of a household or building temperature at a constant level, such as 72° F. (22.22° C.). Should the household thermostat (not shown) initiate a demand for heat because the building temperature has fallen below the desired range set into the thermostat, an output from the household thermostat energizes suitable mechanism, such as a solenoid, to switch the three-way valve 26 so as to deliver solar fluid to the conduit 132 connecting through a service valve 134 to a solar fluid coil 128 having heat transfer fins 130 and lodged in the airstream between the household regions 125 and 126, the mechanism switching the three-way valve 36 along with the three-way valve 26 so as to open a circulation path powered by the pump 38. The fluid in the circulation path circulates solar fluid received from the solar collector 10. The solar fluid entering the coil 128 is regulated by the service valve 134 and, when exiting the coil 128, is regulated by a service valve 136. The circulating solar fluid returns to the solar panels 12 through a return conduit 138 which connects through the three-way valve 36 to the solar fluid supply conduit 14.

In the temperate climates of the earth, it is generally true during the daylight hours that the heat energy collected by the solar collector 10 will be adequate to meet household heating requirements during the daylight hours and additionally maintain the desired 140° F. (60° C.) temperature in the holding tank. months, and during heavily obscured daytime intervals during the wintry months, direct solar heating from the collector 10 through the coil 128 will ordinarily not be adequate to satisfy household needs.

This inability of the solar collector 10 to satisfy household needs is recognized by the temperature sensor 24, which provides a signal disabling or turning off the three-way valve 26 and energizing a pump 150 along with a solenoid valve 142. The solenoid valve 142 opens to allow the pump 150 to draw water being stored in the holding tank through a conduit 140 to a water coil 144 disposed in the airstream between the household regions 125 and 126 and eqipped with appropriate heat transfer fins 146, and then back to the holding tank through a conduit 148.

This circuitry allows the water being held at 140° F. (60° C.) to be utilized for household heating by reason of circulation through the coil 144.

It will be noted, of course, that this last described mode of household heating occurs at the expense of the heat contained in the water stordinarily when further heat is not being rendered available by the solar collector 10. The consequent decrease in the heat stored in the holding tank is monitored by the temperature sensor 74; and when the holding tank temperature has fallen to a predetermined level, such as 110° F. (43.33° C.), engine 124, such signal initiating operation of the heat engine in the heating mode in which the refrigerant coil 152 serves as a condenser and the regrigerant coil 154 serves as an evaporator.

The ensuing presence of a relatively low refrigerant pressure in the refrigerant coil 154 drives the pressure valve 122 to its open position, thus permitting blended water at approximately 65° F. (18.33° C.) to be circulated through the water coil 156 for the delivery of heat energy to the refrigerant then circulating in the refrigerant coil 154.

Regarding this operating mode, it can be noted that the blending valve 118 is required only to elevate the temperature of approximate 55° F. (12.78° C.) well water to 65° F. (18.33° C.); and, for most purposes, the heat energy remaining in the then 110° F. (43.33° C.) storage tank will be adequate for prolonged periods, such as several weeks, during which thermal energy from the solar collector 10 may remain unavailable. One can appreciate, however, that a period of several weeks without available solar energy, regardless of the season of the year, is quite unlikely to occur.

It can be further noted that, even upon an exhaustion of the heat energy available from the holding tank, household heating can nevertheless continue for an unlimited period of time by reason of the thermal energy remaining available in the geothermal or well water.

During the summer months, the typical problem in the temperate zones involves the cooling of the household air. In the practice of the present invention, the need for air cooling is readily satisfied by means of a thermostatic switch (not illustrated) which will energize the heat engine 124 to operate in the air-conditioning mode, thus to circulate its own refrigerant in the direction which causes the upper coil 152 to serve as an evaporator and the lower coil 154 to serve as a condenser. In view of the foregoing discussion, it is believed that such air-cooling operation can occur indefinitely as needed, depending upon the size of the well available or the size and capacity of any equivalent geothermal heat transfer means.

Figures 2, 3:
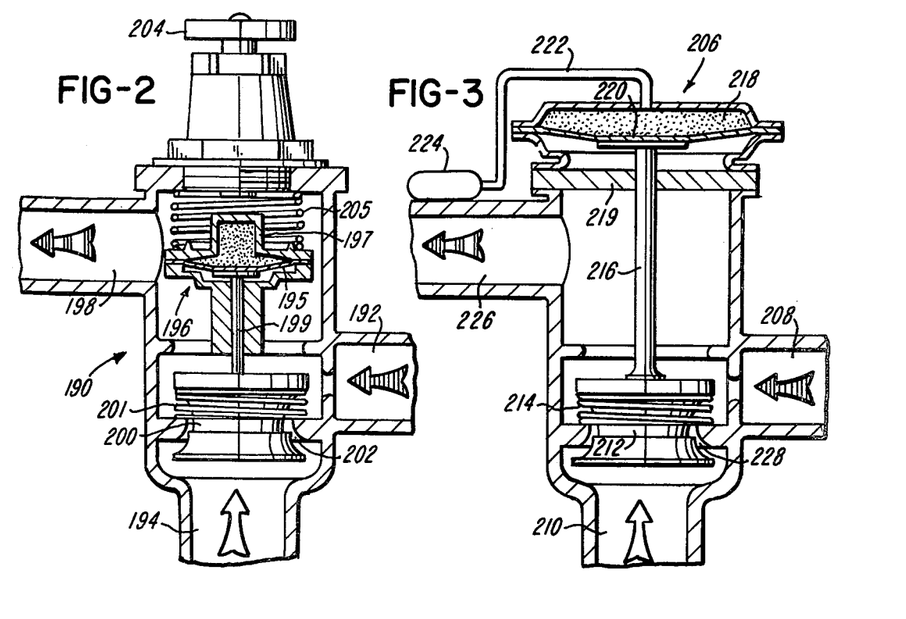
FIG. 2 is a section view of a first type of blending valve suitable for use in the present invention.
FIG. 3 is a section view of a second type of blending valve suitable for use in the present invention.

FIGS. 2 and 3 illustrate valve mechanisms which can be suitably used in the present invention as the blending valve 118, whose functions have been previously described. The valve 190 of FIG. 2 is a conventional thermostatic valve having an intake 194 and which has been modified to have an additional inlet 192 for water delivered to the valve from the heat exchanger 112 located in the holding tank 58.

The conventional thermostatic valve intake 194 is connected to receive well water through the previously described conduit 108. A thermostatic control mechanism 196 includes a housing 197 defining a gas chamber containing a gas which valve 190 through its inlet 192 to displace downwardly a diaphragm 195 at one end of the housing, which in turn displaces a pin 199 and a stopper 200 that is biased to a closed position by a spring 201. The stopper 200 admits well water through an annular opening 202 produced by a downward movement of the stopper. The cold water thus permitted to enter the valve 190 comingles with the hot water entering the valve 190 and the reduced response of the thermostatic mechanism 196 to the lower temperature of the comingled water causes the thermostatic control mechanism 196 to home the stopper 200 to a size for the opening 202 which produces a thermally stabilized blend exiting the valve 190 through its outlet opening 198.

The temperature of the stabilized blend is rendered adjustable by rotation of a control device 204 which adjusts a spring 205 acting in opposition to the spring 201. By adjustment of the rotatable device 204, the temperature of the stabilized blend can be preset to the 65° F. (18.33° C.) previously indicated to be preferable.

The valve 206 illustrated in FIG. 3 is again of a conventional type but has been modified to provide a hot water inlet 208, and the conventional inlet 210 for such valve is employed as a well water inlet. The inlet 210 is normally closed by a stopper 212 biased by a surrounding spring 214.

Attached to the stopper 212 is a stem 216 exposed to the bias of a gas contained in a chamber 218 closed by a diaphragm 220. The chamber 218 is shielded from water permitted to enter the valve 206 by an insulating barrier 219. A tube 222 connected to a bulb 224 is an extension of the chamber 218, and the bulb 224 is mounted in thermal exchange contact with the wall surrounding an outlet passage 226.

When the water passing through the valve 206 is a hot water exiting through the outlet passage 226, the gas in the bulb 224 expands, causing the diaphragm 220 to move downwardly, which motion is transmitted by the stem 216 to the stopper 212, which moves downwardly to open a passage 228 surrounding the stopper. This permits the well water delivered to the inlet port 210 to blend with the hot water being delivered to the inlet port 208 and thus reduce the temperature sensed by the gas in the bulb 224. By this mechanism, the valve 206 is stabilized to an intermediate temperature of the two waters entering its inlet ports 208 and 210. The stabilized temperature which will be sensed by the gas bulb can be changed within a reasonable range by changes in the length of the stem 216 and the size of spring 214. Thus, the blend temperature which will be delivered by the valve 206 can be set to the approximate 65° F. (18.33° C.) temperature indicated to be desirable for the blending valve 118.

For many purposes, the valve 206 described in reference to FIG. 3 is preferred for use as the blending valve 118 utilized in the present invention since the temperature to which the valve responds most directly is the temperature of the blend leaving the valve.

The invention as heretofore described in reference to FIG. 1 utilizes the water of the holding tank 58 as part of such a closed system is ordinarily desirable because it enable appropriate anticorrosion compounds to be included in the closed system without the effectiveness of such compounds being diminished by blending with well water as would otherwise result from operation of the blending valve 118. It can thus be noted that the heat exchanger 112 is an isolation type isolates the liquid in the holding tank 58 from the liquid permitted to enter the coil 156.

Figure 4:
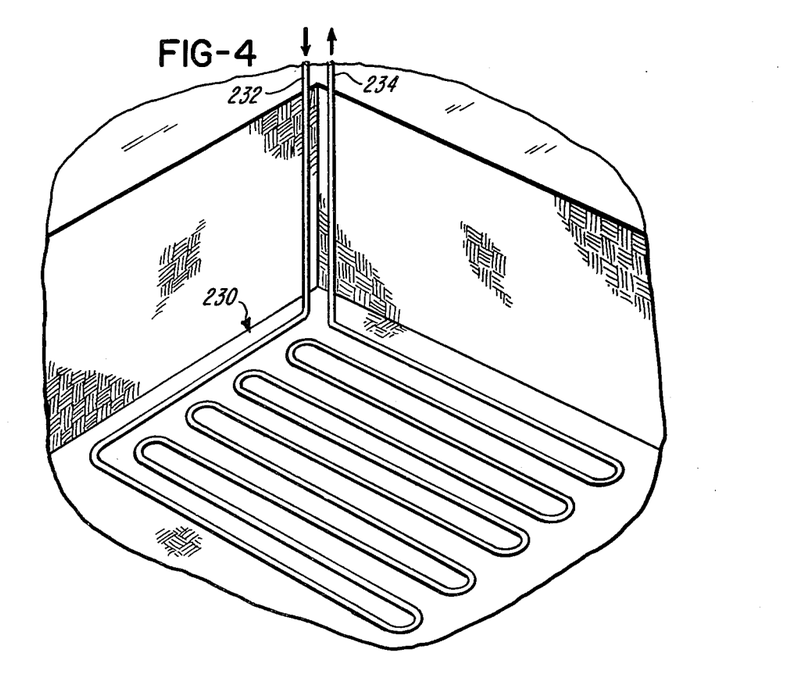
FIG. 4 is a fragmentary diagrammatic illustration of a first modification.

In lieu of the well illustrated in FIG. 1, the present invention may utilize a ground loop 230, such as is illustrated uncovered in FIG. 4. The ground loop comprises a length of pipe or tubing, such as copper tubing, which, for purposes of compactness, may be arranged in the form of a sinusoidal coil, as shown.

The loop 230 is buried in the ground to a depth of approximately eight feet (2.44 m.); and to assure good thermal contact with the ground, a thin layer of sand may be interposed between the ground and the loop 230. The purpose of the thin layer of sand, if used, is to allow settlement or shifting of the ground to occur without loss of a good thermal exchange between the ground and the loop 230.

As schematically illustrated, the loop 230 will have an inlet tube 232 and an outlet tube 234 extending from the opposite ends thereof and upwardly through the earth for attachment to the heating and cooling system already described with reference to FIG. 1. Thus, the inlet tube 232 would be connected as an extension of the return conduit 164 illustrated in FIG. 1 and the outlet tube 234 would be connected to a suitable pump mechanism (not shown) for advancing the water resident in the loop 230 to the service valve 90 illustrated in FIG. 1. Thus, the ground loop 230, together with an appropriate pump (not shown), would replace the well 84 and its associated pump 86 currently appearing in FIG. 1.

For a household of say 1500 square feet (139.5 square illustrated in FIG. 4, may extend for some 1500 lineal feet (457.20 m.) at the approximate eight foot (2.44 m.) depth that has been mentioned. The water resident in the loop 230 for sufficient periods of time will come to thermal equilibrium with the earth at the approximate eight foot (2.44 m.) depth and in most regions of at least North America the equilibrium temperature will be in the vicinity of 55° F. (12.78° C.). The ground loop thus offers advantages similar to that of the well 84 described in reference to FIG. 1. However, since the loop is horizontally disposed, there will not be the tendency for a layer of warm water to accumulate in the ground loop as exists in a vertically disposed well.

To prevent freezing of the inlet and outlet tubes 232 and 234, these may be required to be well insulated. However, in some installations, the inlet and outlet tubes 232 and 234 will enter the house or building serviced by the loop through a basement floor or a slab, at a central location where freezing can be avoided. Alternatively, and for the same purpose, an appropriate amount of an antifreeze agent, such as ethylene glycol, can be added to the water in the loop 230, which, as apparent in FIG. 1, can form a closed system with the isolation type heat exchanger 112, the water coil 156 and the blending valve 118.

Figure 5:
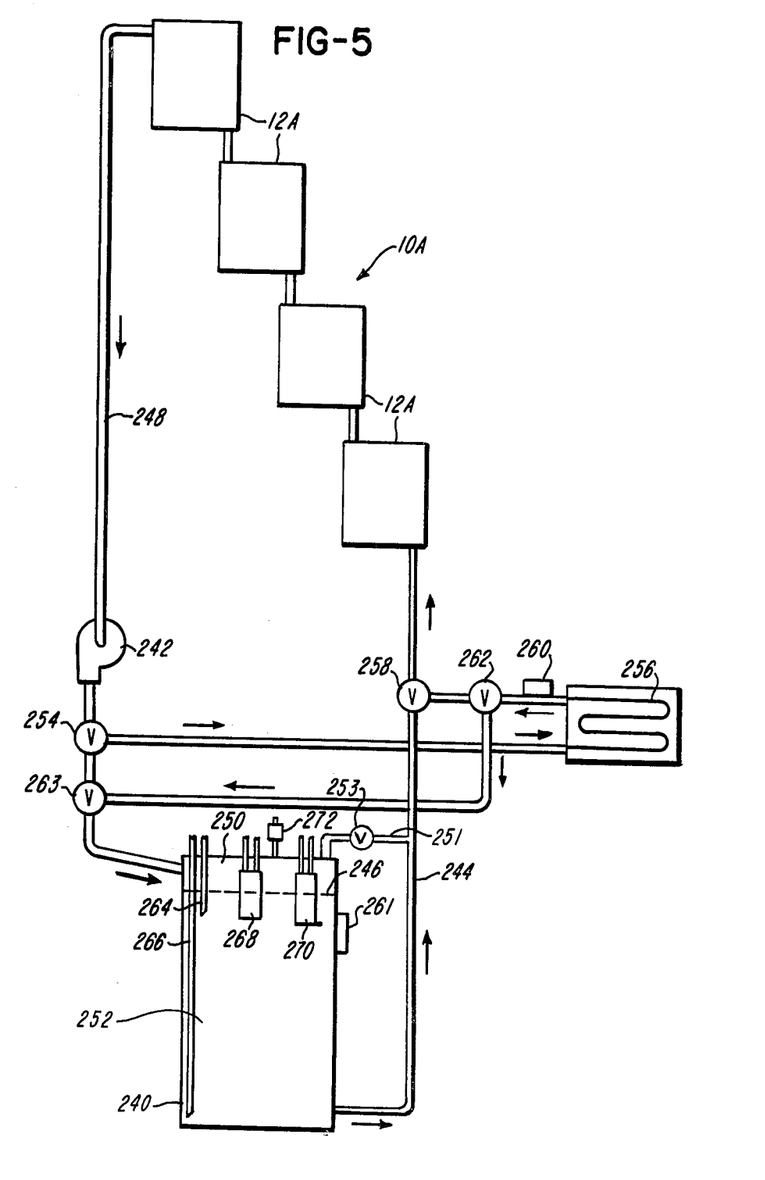
FIG. 5 is a diagrammatic illustration of a second modification.

It can be noted, of course, that either in the preferred embodiment of FIG. 1 or the modification of FIG. 4, it has been expedient to isolate the fluid associated with the solar collector 10 from the liquid associated with the holding tank 58 and with the well or ground loop heretofore described in this application. FIG. 5 illustrates a further modification which vastly simplifies the structure of FIG. 1 by eliminating the need for an isolation type of heat transfer unit, such as the unit 30. The unit 30 offers the advantage within the framework of FIG. 1 of providing isolation between the oil base liquid associated with the solar collector of FIG. 1 and the storage water associated with the holding tank 58.

The structure of FIG. 5 eliminates the need for an isolation device, such as the heat transfer unit 30, by utilizing an oil, such as mineral oil, which is immiscible in water and so designing the system that the oil is always afforded an opportunity to rise to the top of the water included in the system. To this end, a modified solar collector 10A comprises several downwardly stepped panels 12A so assembled as not to entrap water therein, although water may pass through the panels. Thus, the panels and the connecting pipes therebetween may be assembled with a slight tilt (notdetailed in the drawings). The purpose of the slight tilt is to afford an opportunity for any water that may enter the solar collection panels to drain downwardly out of the collection panels and ultimately to a modified holding tank 240 illustrated in FIG. 5. Thus, even though water may be cycled along with oil through the solar collection panels, any water residing in the collection panels will be afforded an opportunity to drain away from the collection panels and to return to the storage tank 240 when the pumping action which has moved the water into the collection panels has ceased.

FIG. 5 schematically illustrates an impeller type pump 242 for advancing liquid from the solar panels 12A downwardly to the storage tank 240. Fluid pumped downwardly 10A through a conduit 244.

During the course of installation of the heating and cooling system of FIG. 5 the holding tank 240 is filled substantially with a water containing suitable corrosion-resistant additives and then the solar collector 10A with its associated panels 12A are filled with a suitable oil-based liquid, such as mineral oil. For purposes of illustration, there has been shown by broken line 246 the miniscus or separation line between oil 250 and water 252, the oil being the lighter of the two liquid components. The oil fills all portions of the assembly illustrated in FIG. 5 which are vertically above the separating line 246 and the water fills all portions of the system which are vertically below the separating line 246.

The separation line 246 is to be understood as arbitrarily located for the purpose of description. The basic objective is to have a sufficient volume of oil-based liquid in the system to fill the solar panels 12A and the interconnections therebetween. Thus, whenever the pump 242 is idle, the oil-based liquid will migrate under the pressure of any overlying water into the solar panels, it being generally unimportant where the oil-to-water interface occurs so long as that interface is below the solar panels 12A.

Assuming the oil-based liquid residing in the solar panels 12A has absorbed a supply of irradiated solar heat which is to be transferred to the holding tank 240, the pump is energized to move liquid from the panels 12A downwardly whereby the oil-based liquid theretofore residing in the solar panels 12A is conducted down by conduit 248 to enter the solar tank 240. Since the fluid now entering the tank 240 is the oil-based liquid 250, that liquid will tend to float on top of the water 252 residing in the tank. Of course, as the oil-based liquid 250 enters the tank 240, the water 252 is being displaced by operation of the pump 242 upwardly through a conduit 244 to enter the panels 12A.

In regards to the foregoing fluid movement, it can be appreciated that the tank 240 and the assembled panels 12A operate basically as a closed system, the consequence being that when the pump 242 moves the fluid downwardly from the panels 12A to the tank 240, the pump is also moving fluid upwardly from the tank 240 along the return conduit 244 to the panels 12A. Since the foregoing system is closed, the impeller-type pump might be mounted in the conduit 244 instead of the conduit 248. For some purposes, the pump 242 is preferably placed in the conduit 244 since this will sometimes reduce the heat to which the pump elements will be exposed.

It can beunderstood that with a continuing operation of the pump 240, all of the oil initially residing in the panels 12A will be lowered into the tank 240 and the indicated separating line 246 will have lowered in proportion to the amount of oil entering the tank. In time, essentially all oil initially residing in the panels 12A will have been lowered into the tank 240 and an equal amount of water will have been raised upwardly into the panels 12A. With continued operation of the pump 242, the water that has replaced the oil which initially resided in the panels 12A will descend downwardly, due to continued operation of the pump 242, into the tank 240 as additional water is raised upwardly through the conduit 244 to the solar panels 12A. With this continuing operation, the oil-based liquid 250 continues to float on top of the water residing in the tank 240, and the water moving downwardly from the panels 12A drops gravitationally If the oil which floats above the water in the tank 240 is hotter than the water descending from the panels 12A, heat will be transferred from the oil to the water which is descending through the oil. If on the other hand, the oil floating above the water in the tank 240 is cooler than the water descending from the panels 12A, heat will be transferred from the descending water to the oil.

It can be noted that from the starting condition in which only the oil-based liquid resided in the panels 12A, a continuing operation of the pump 242 has transferred the oil from the panels 12A to the upper part of the tank 240, and with continuing operation of the pump 242, only water has been cycled through the panels 12A and caused to equilibrate with the oil floating in the tank 240, thus, operating to continually transfer solar energy downwardly from the panels 12A to the tank 240. Whenever the pump 242 is now turned off or disabled, the water then residing in the panels 12A will settle downward through the conduit 244 to enter the tank 240, and this downward settlement of water will displace the oil residing in the tank 240 upwardly through the pump 242 and through the conduit 248 into the panels 12A. Thus, the system operates to fill the panels 12A with oil during those periods when the pump 242 is idle and to transfer the oil to the tank 240 during those periods when the pump 242 is operating.

In order to assure rapid and complete filling of the panels 12A with oil, the structure of FIG. 5 may further include a conduit 251 connecting the top of the tank 240 to the conduit 244 and providing an additional path for oil to migrate upwardly into the panels. A normally open, solenoid operated valve 253 is disposed in conduit 251 and is closed by its solenoid when the pump 242 is operating. When the pump is turned off, valve 253 will open and oil will consequently be permitted to migrate from the tank up to the collectors through both conduit 248 and conduit 251.

By filling the panels 12A with oil when the pump 242 is idle, potential damage or destruction of the panels and other portions of the system because of freezing during cold weather is avoided. That is, during winter months when the outside air may be below 32° F. (0° C.), and the pump 242 is not operating, for example, because of a lack of sunlight, the water used for circulation through the collector to transfer solar heat to the holding tank is replaced by a liquid such as the aforementioned oil-based liquid, which will not freeze. During the summer months, when the pump is idle, boiling brought on by intense solar heat is avoided since the oil-based liquid will not boil as readily as water.

As was the case with FIG. 1, which illustrates a 3-way valve 26 operable to divert the oil-based solar liquid to a heating coil 128, the embodiment of FIG. 5 illustrates a valve 254 operable to divert whatever liquid is descending from the panels 12A to a heating coil 256.

In FIG. 5, the fluid passing through the coil 256 is provided with alternative return routes. The temperature of the fluid emerging from the coil 256 is sensed by a thermostat device 260, operating in cooperation with a thermostat device 261 sensing the temperature of the fluid residing in the holding tank 240. If the thermostat device 260 senses a temperature greater than the temperature which is sensed by the thermostatic device 261, a 3-way valve 262 is opened in combination with a 3-way valve 263 to deliver fluid emerging from the coil 256 to the holding tank 240. If the temperature conditions are the reverse, the fluid emerging from the coil 256 is returned to the solar panels 12A by operation of a 3-way valve 258.

As was the case with the preferred embodiment the holding tank 240 may be entered by conduits 264 and 266 analogues to the conduits 140 and 148 described in reference to FIG. 1, such conduits allowing fluid in the tank 240 to be circulated to a heating coil, not shown, which would be analogous to the coil 144 illustrated in FIG. 1. The conduits 264 and 266 have their lower ends located sufficiently deeply into tank 240 that primarily water rather than oil will be withdrawn from the tank 240 through the conduits 264 and 266.

Analogous to the heat exchanger 112 of FIG. 1, the embodiment of FIG. 5 may have immersed in the tank 240 a heat exchanger 268 for servicing the needs of a blending valve such as the valve 118 of FIG. 1.

In further analogy to the system of FIG. 1, there may be immersed in the tank 240 a heat exchanging device 270 for supplying domestic hot water needs. Those skilled in the art will appreciate that the heat exchanging devices 268 and 270 may be intergrated into a single unit.

As is conventional in a closed fluid system, the tank 240 is preferably provided with a vent 272 to vent excess air from the tank 240.

While the embodiments of FIGS. 2 and 4 illustrate first a well and then an underground loop for providing a reservoir of low, or earth, temperature it should be appreciated that other reservoirs, such as lakes and streams as well as subterranean waters, may be utilized to provide a reservoir of water which is in thermal exchange relationship with the earth.

Furthermore, while the present invention illustrates a heat engine employing coils for thermal exchange between a refrigerant residing in the coils, and surrounding or adjacently disposed fluid, an obvious reversal within the scope of the present invention is to support the refrigerant in any suitable container or containers and to place the fluid with which a thermal exchange is to take place in coils or the like which pass through the refrigerant.

In general, the water which is in thermal contact with the earth will provide a temperature in the vicinity of 55° F. (12.78° C.) at levels below which ice may form and in general the blender valves illustrated in FIGS. 2 and 3 are set to blend the relatively hot water of the holding tank with the relatively cool water in thermal contact with the earth to a temperature of approximately 65° F. (18.33° C.).

Those skilled in the art will appreciate, however, that the preferential temperature of the blended water utilized in the present invention can be changed to meet the requirements of the heat engine and its associated components.

Although the preferred embodiments of this invention have been described, it will be understood that various changes may be made within the scope of the appended claims.

Having thus described my invention, I claim:

1. In a heating system including a heat engine comprising, in combination, a reservoir of water and means for withdrawing water from said reservoir and placing said water in contact with the evaporation coil of a heat engine, the improvement comprising a casing for said reservoir, an aerator for return of water from contact with said evaporation coil to said reservoir, heat transfer means for exchanging heat between water returned to said reservoir and said casing, said aerator spraying said water upon said heat transfer means.

* * * * *

UNITED STATES PATENT AND TRADEMARK OFFICE
CERTIFICATE OF CORRECTION

PATENT NO. : 4,215,551
DATED : August 5, 1980
INVENTOR(S) : JOHN W. JONES

It is certified that error appears in the above-identified patent and that said Letters Patent are hereby corrected as shown below:

Column 10, line 29, "eqipped" should be ---equipped---

Column 10, line 37, after "water" insert ---stored in the holding tank and occurs ordinarily---; same line, delete "stordinarily"

Column 10, line 42, after "(43.33°C.)," insert ---the temperature sensor 74 outputs a signal to the heat---

Column 10, line 45, "regrigerant" should be ---refrigerant---

Column 10, line 65, delete "an"

Column 11, line 13, before "that" insert ---apparent---

Column 11, line 29, after "which" insert -- responds initially to the heat of the water delivered to the---

Column 12, line 20, after "part" insert ---of a closed system with the heat exchange coil 144. The use---

Column 12, line 22, "enable" should be ---enables---

Column 12, line 27, after "type" insert ---of heat exchanger which, in addition to allowing heat exchange,---

Column 12, line 57, after "square" (2nd occ.) insert -- meters) living area, the loop 230, which has been only schematically---

Column 13, line 53, after "downwardly" insert ---to the tank 240 is afforded a return path to the collector---

UNITED STATES PATENT AND TRADEMARK OFFICE
CERTIFICATE OF CORRECTION

PATENT NO. : 4,215,551
DATED : August 5, 1980
INVENTOR(S) : JOHN W. JONES

It is certified that error appears in the above-identified patent and that said Letters Patent are hereby corrected as shown below:

Column 2, line 30, "pluarlity" should be ---plurality---

Column 3, line 1, "aong" should be ---along---

Column 3, line 45, "convention" should be ---conventional---

Column 4, line 67, "in" should be ---is---

Column 5, line 21, "(88.22°C.) should be ---(82.22°C.)---

Column 5, line 23, "outweight" should be ---outweigh---

Column 9, line 5, before "for the coil 154," insert (new paragraph) ---It will be appreciated that during the condensing mode---

Column 9, line 11, after "the" (second occurrence), insert ---greater is the volume of water presented to the coil 154---

Column 9, line 17, after "of" insert ---the refrigerant coil 154 of the heat engine 124.---

Column 9, line 22, "descried" should be ---described---

Column 9, line 24, "temperature" should be ---temperate---

Column 9, line 50, "140°C." should be ---140°F.---

Column 10, line 16, before "months," insert (new paragraph) ---During nighttime intervals, especially in the wintry---

UNITED STATES PATENT AND TRADEMARK OFFICE
CERTIFICATE OF CORRECTION

PATENT NO. : 4,215,551

DATED : August 5, 1980

INVENTOR(S) : JOHN W. JONES

It is certified that error appears in the above-identified patent and that said Letters Patent are hereby corrected as shown below:

Column 14, line 52, after "gravitationally" insert ---through the oil-based liquid 250.---

Column 15, line 58, "analogues" should be ---analogous---

Signed and Sealed this

Twenty-third Day of December 1980

[SEAL]

Attest:

SIDNEY A. DIAMOND

Attesting Officer

Commissioner of Patents and Trademarks